(12) United States Patent
Nadeau et al.

(10) Patent No.: US 6,540,240 B2
(45) Date of Patent: Apr. 1, 2003

(54) COLLAPSIBLE COMPARTMENT FOR A SHOPPING CART

(75) Inventors: Serge Nadeau, Montreal (CA); Jean-Christophe Doyon, Verdun (CA)

(73) Assignee: Les Industries Rondi Inc., Montreal (CA)

( * ) Notice: Subject to any disclaimer, the term of this patent is extended or adjusted under 35 U.S.C. 154(b) by 0 days.

(21) Appl. No.: 09/883,413

(22) Filed: Jun. 18, 2001

(65) Prior Publication Data
US 2002/0020976 A1 Feb. 21, 2002

Related U.S. Application Data
(60) Provisional application No. 60/249,448, filed on Nov. 20, 2000.

(30) Foreign Application Priority Data

Jul. 12, 2000 (CA) ............................................. 2314774

(51) Int. Cl.[7] .............................................. B62D 63/00
(52) U.S. Cl. ............................. 280/33.993; 297/256.17
(58) Field of Search ....................... 280/33.991, 33.992, 280/33.993, 33.994, 33.995, 33.996, 33.997, 33.998, 651, 47.34; 297/256.16, 256.17

(56) References Cited

U.S. PATENT DOCUMENTS

| | | | | |
|---|---|---|---|---|
| 2,964,326 A | * | 12/1960 | Schray ................... | 280/33.993 |
| 3,070,384 A | * | 12/1962 | Buczak ................... | 280/33.993 |
| 3,645,554 A | * | 2/1972 | Stein et al. ............. | 280/33.991 |
| 3,999,774 A |   | 12/1976 | Rehrig ................. | 280/33.99 R |
| 4,046,394 A |   | 9/1977 | Thompson, Jr. ..... | 280/33.99 B |
| 4,544,171 A |   | 10/1985 | Kellogg ............... | 280/33.99 A |
| 4,682,782 A |   | 7/1987 | Mills .................... | 280/33.99 B |
| 5,348,323 A | * | 9/1994 | Trubiano ............... | 280/33.993 |
| 5,368,318 A | * | 11/1994 | Rehrig et al. .......... | 280/33.993 |
| 5,630,599 A | * | 5/1997 | Adamson et al. ...... | 280/33.993 |
| 6,320,552 B1 | * | 5/2002 | Veron .................... | 297/256.17 |

FOREIGN PATENT DOCUMENTS

| | | | |
|---|---|---|---|
| CA | 2210416 | | 1/1999 |
| CA | 2091969 | | 7/1999 |
| JP | 585365 | * | 4/1993 |
| WO | WO95/03201 | | 2/1995 |

* cited by examiner

Primary Examiner—Brian L. Johnson
Assistant Examiner—Bryan Fischmann
(74) Attorney, Agent, or Firm—St. Onge Steward Johnston & Reens LLC

(57) ABSTRACT

A collapsible compartment of a shopping cart. The collapsible compartment includes a swinging rear wall and fixed side walls of the shopping cart and a pivoting assembly. The pivoting assembly includes a pivoting base wall having a first edge for pivot connection to the swinging rear wall and a second edge opposite the first edge. It further includes a pivoting front wall having a first edge for pivot connection between the side walls of the shopping cart, and a second edge, opposite the first edge thereof, pivotally connected to the second edge of the pivoting base wall. The compartment further includes a pivoting panel assembly having a panel pivotable between a first position where the panel rests over the base wall and a second position where the panel is covering leg holes in the swinging rear wall, and an out of reach spring element to urge the panel in the second position.

24 Claims, 16 Drawing Sheets

COLLAPSIBLE COMPARTMENT FOR A SHOPPING CART

CROSS-REFERENCE TO RELATED APPLICATIONS

This application claims the benefit of, under 35 U.S.C. 119(e), U.S. Provisional Patent Application No. 60/249,448, filed Nov. 20, 2000.

FIELD OF THE INVENTION

This invention relates, in general, to shopping carts, and in particular to different features of a collapsible compartment that can be used as a baby seat in a shopping cart.

BACKGROUND OF THE INVENTION

Already known in the prior art, there are various constructions of collapsible compartments for shopping carts of the type having a basket provided with a swinging rear wall which hingedly swings upwardly into the basket to permit nesting of like carts. These collapsible compartments, which are either used as a baby seat or as an additional basket for goods bought, are mounted to the swinging rear wall, and are caused to collapse during nesting of the carts. They are so designed that when a shopping cart is removed from a nested assembly, the collapsed compartment is maintained in a substantially collapsed position. It is then necessary for the users wishing to use the compartment to open the same. As mentioned in the applicant's prior laid-open application CA 2,210,416, this process, which may seem very simple at first sight, may become pretty complex, especially when the users are carrying an infant in one arm and are using a single hand to try to open the compartment. The collapsed element may also cause injury to the fingers of the user. It is thus desirable for certain types of shopping carts that the collapsible compartment be maintained in a usable form for the placement of an infant or goods within the same.

In its prior laid-open application CA 2,210,416, the applicant disclosed such a collapsible compartment which comprises abutment projections projecting sideways in the plane of the backrest and extending over a top edge of the side walls of the basket of the shopping cart. These projections prevent the backrest from collapsing inside the basket. A pair of link arms which hingedly connects the rear gate to the backrest above a bottom edge thereof is also provided for maintaining the backrest in a substantially vertical position.

It is also common in the prior art to provide the collapsible compartment with a pivotable panel for covering the leg through holes in the rear gate. Such a pivotable panel is normally movable between a horizontal position to be used as a seat and a vertical position to cover the leg holes in the rear gate to be used as an additional compartment for goods. A helical spring, operatively mounted adjacent to the panel, is often provided for urging the panel in the vertical position. One drawback with such biasing means is that it often breaks rapidly. Also, it may cause injury to an infant playing with it, and that even more if it is broken.

Examples of prior art collapsible compartments are given in U.S. Pat. No. 5,368,318; U.S. Pat. No. 3,999,774; U.S. Pat. No. 4,682,782; U.S. Pat. No. 4,544,171; U.S. Pat. No.4,046,394; CA 2,091,969; WO 95/03201; and Canadian laid-open patent application no. 2,210,416.

SUMMARY OF THE INVENTION

An object of the present invention is to provide an improved collapsible compartment for a shopping cart.

According to one aspect of the present invention, this object is achieved with a pivoting assembly for a collapsible compartment of a shopping cart, the collapsible compartment including a swinging rear wall and fixed side walls of the shopping cart. The pivoting assembly comprises a pivoting base wall having a first edge for pivotal connection to the swinging rear wall and a second edge opposite the first edge. The pivoting assembly further comprises a pivoting front wall having a first edge for pivotal attachment between the side walls of the shopping cart, and a second edge, opposite the first edge thereof, pivotally connected to the second edge of the pivoting base wall.

An advantage of this pivoting assembly over the prior applicant's collapsible compartment described above is that since the first edge of the front wall is for pivot attachment between the side walls of the basket, the link arms described above are no longer required to maintain the front wall in a substantially vertical position.

According to another aspect of the present invention, this object is achieved with a pivoting panel assembly for a collapsible compartment of a shopping cart, the collapsible compartment including a swinging rear wall of the shopping cart, and a base wall having a first edge connected to the swinging rear wall. The pivoting panel assembly comprises a spring element having a first end portion for abutment against the swinging rear wall, opposite a second end portion. The pivoting panel assembly further comprises a panel having a first edge for pivot connection to the swinging rear wall on a pivot axis coaxial with a folding line of the spring element separating the first and second end portion thereof. The panel is pivotable between a first position where the panel rests over the base wall and a second position where the panel is covering leg holes in the swinging rear wall. The first edge of the panel has a section underneath the panel for receiving the second end portion of the spring element to urge the panel in the second position. Retaining means are provided for releasably retaining the panel in the first position.

As can be appreciated, the second end portion of the spring element, which lies underneath the panel, is out of reach of a child sitting in the compartment and thus one advantage of a panel assembly according to the present invention is that it greatly reduces the risk of injuries caused by the spring element.

According to a further aspect of the invention, a plastic shopping cart is proposed. The plastic shopping cart comprises:
  a wheeled frame;
  a basket mounted elevated on the frame and including a bottom wall, two side walls, a front wall and a swinging rear wall to permit nesting of the cart with like shopping carts, the swinging rear wall having an inside face facing towards the front wall of the basket and a spring receiving groove in the inside face thereof, the spring receiving groove being vertically and centrally positioned in the swinging rear wall;
  a collapsible compartment inside the basket including the side walls and the swinging rear wall of the basket, and a pivoting assembly comprising:
    a pivoting base wall having a first edge with at least two molded hooking members each for removable pivot connection of the first edge to a pivot axis in the swinging rear wall, and a second edge opposite the first edge;
    a pivoting front wall having a first edge for pivot connection between the side walls of the shopping cart, and a second edge, opposite the first edge thereof, pivotally connected to the second edge of the pivoting base wall, the first edge of the front wall having two opposite side ends each consisting in an extension member extending at substantially right angle with the front wall, and the front wall having a pivot member projecting sidewards from each of said extension members for insertion into a pivot housing provided in a corresponding side wall of the basket proximate a top edge thereof, the pivot member being sized to freely rotate in the pivot housing;

a panel having a first edge with two opposite side ends and a pivot shaft projecting sidewards from each side end of the panel for insertion into a notch provided on the inside face of the swinging rear wall, the panel being pivotable on a pivot axis between a first position where the panel rests over the base wall and a second position where the panel is covering leg holes in the swinging rear wall, the panel being made of a one piece material and comprising a top side, an underside and a spring receiving housing molded centrally at the first edge thereof underneath the panel, the housing including a slanted top wall sloping upwardly from the top side of the panel towards the first edge thereof;

actuating means for actuating a pivotal movement of the panel towards the second position upon a forward displacement of the swinging rear wall, the actuating means comprising:
an abutment rib molded on each pivot shaft of the panel below the pivot axis thereof;
a cam like projection molded on two of the at least two hooking members of the base wall and projecting upwardly from the first edge of the base wall for engaging a corresponding one of said abutment ribs of the panel upon forward displacement of the swinging rear wall and thereby producing motion of the panel towards the second position;
a spring blade to urge the panel in the second position, the spring blade having:
a first end portion for insertion in the spring receiving groove and for abutment against the swinging rear wall, and
a second end portion opposite the first end portion, for abutment against the top wall of the spring receiving housing of the panel to urge the panel in the second position, the first and second end portion being separated by a folding line of the spring element coaxial with the pivot axis of the panel; and
a retaining means for releasably retaining the panel in the first position, the retaining means comprising a hooking member projecting from the underside of the panel, the hooking member being removably engageable to a hook anchoring member provided in the base wall.

BRIEF DESCRIPTION OF THE DRAWINGS

These and other objects and advantages of the invention will become apparent upon reading the detailed description and upon referring to the drawings in which.

Figure 1:
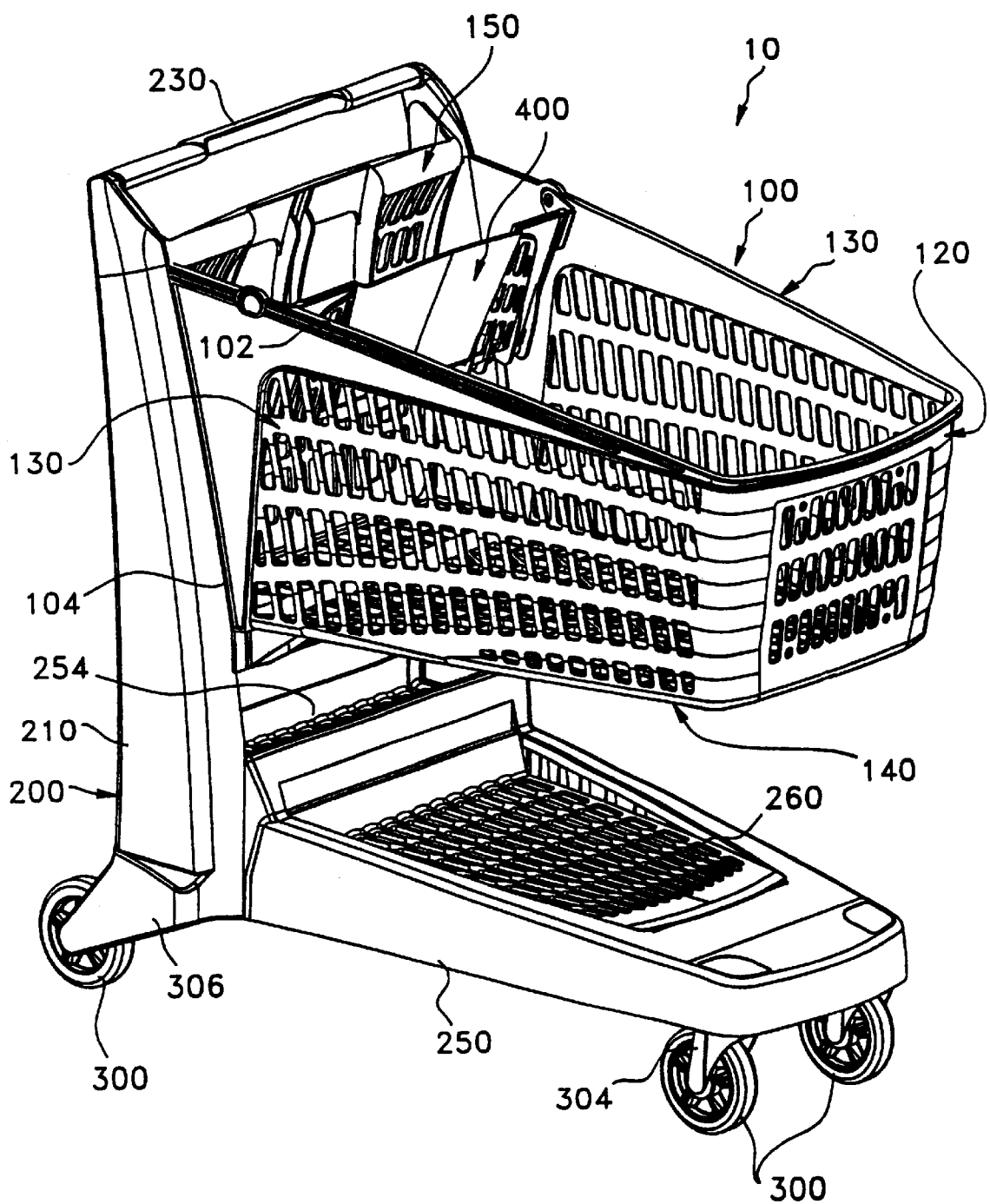
FIG. 1 is a perspective view of a shopping cart embodying features of the present invention.

While the invention will be described in conjunction with an example embodiment, it will be understood that it is not intended to limit the scope of the invention to such embodiment. On the contrary, it is intended to cover all alternatives, modifications and equivalents as may be included as defined by the appended claims.

CLARIFYING DETAILS

| | |
|---|---|
| 10 | Shopping cart |
| 100 | basket |
| 102 | reinforcement band |
| 104 | vertical ribs along the rear side |
| 120 | front wall |
| 130 | two side walls |
| 132 | pivot housing in the side walls |
| 133 | lumps |
| 134 | top edge of the side walls |
| 140 | bottom wall |
| 150 | swinging rear wall |
| 152 | leg holes |
| 154 | restraint lumps |
| 155 | pivot shafts |
| 156 | ribs and groove |
| 158 | top edge of the swinging rear wall |
| 159 | rotation axis |
| 162 | notches |
| 172 | spring receiving groove |
| 200 | frame for holding the basket |
| 210 | studs members |
| 212 | grooves |
| 230 | handle |
| 250 | base of the frame |
| 254 | lower basket |
| 260 | lower support |
| 300 | wheels |
| 304 | pivoting casters |
| 306 | fixed casters |

-continued

| | |
|---|---|
| 400 | pivoting assembly of the collapsible compartment |
| 410 | base wall of the compartment |
| 411 | openings in the base wall |
| 412 | first edge of the base wall |
| 414 | hooking member at the first edge of the base wall |
| 414a | outer hook |
| 414b | inner hook |
| 415 | hooking member at the second edge |
| 418 | second edge of the base wall |
| 420 | front wall of the compartment |
| 422 | central zone of the front wall |
| 424 | sides openwork |
| 426 | second edge of the front wall |
| 428 | pivot axis of the front wall |
| 430 | first edge of the front wall |
| 432 | side ends of the first edge of the front wall |
| 434 | extension member |
| 436 | pivot member |
| 470 | a panel |
| 472 | first edge of the panel |
| 474 | pivot shafts or pivot axes of the panel |
| 476 | spring blade |
| 476a | first end portion of the spring blade |
| 476b | second end portion of the spring blade |
| 477 | folding line in the spring blade |
| 478 | housing for the spring blade |
| 480 | hooking member underside the panel |
| 490 | abutment rib |
| 492 | cam like member |

DESCRIPTION OF A PREFERRED EMBODIMENT

The following description, similar features in the drawings have been given similar reference numerals and in order to lighten the figures, some elements are not referred to in some figures if they were already identified in a precedent figure.

Figure 2:
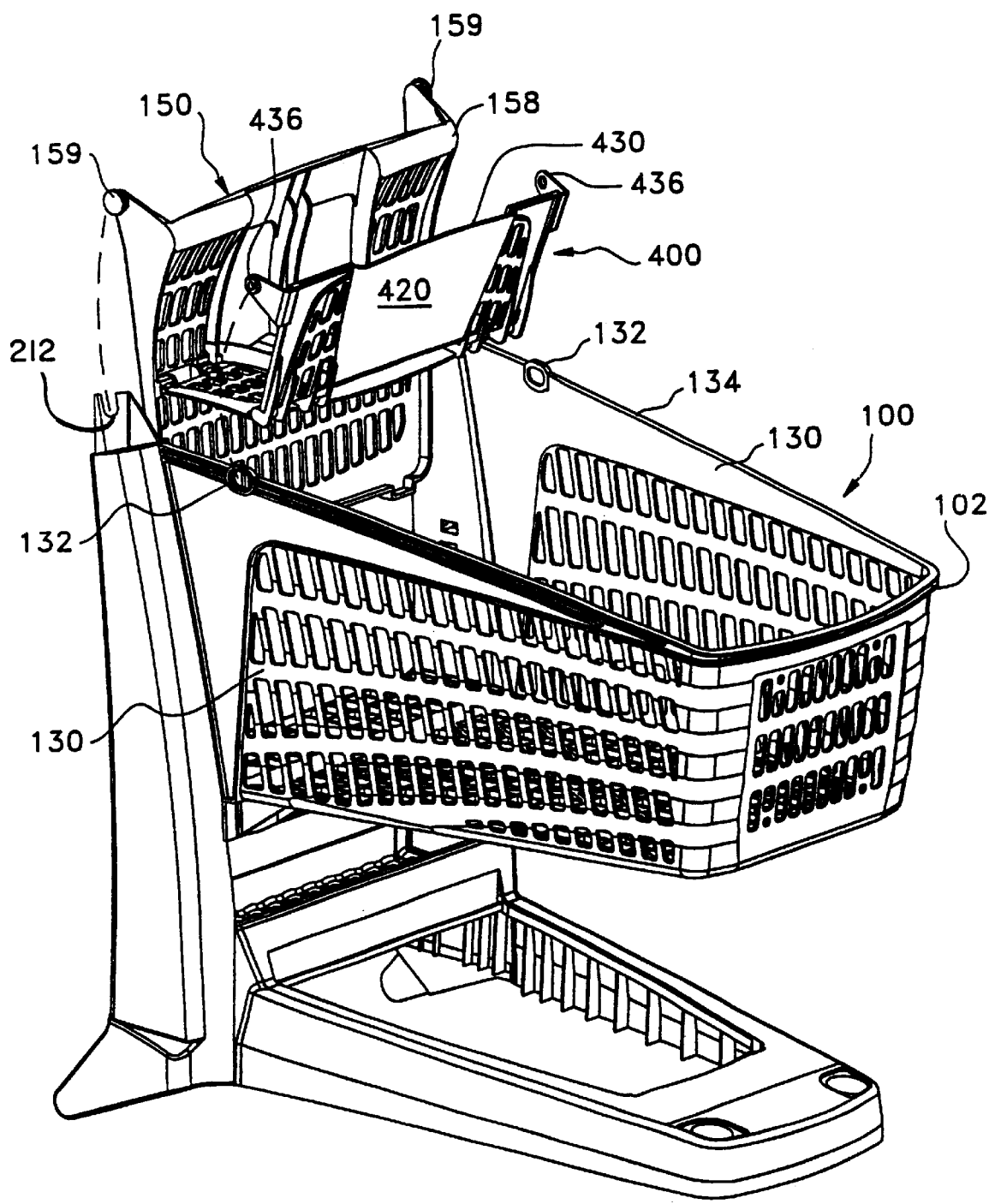
FIG. 2 is another perspective view of the cart of FIG. 1 without its wheels and with the swinging rear wall and the pivoting assembly shown in exploded view, to show how the swinging rear wall is pivotally mounted between the rear studs of the cart.

Referring to FIGS. 1 and 2, a shopping cart (10) embodying features of the present invention is illustrated. The shopping cart (10) includes an elevated basket (100) which is preferably made of one single plastic piece. It is however understood that the shopping cart and its components could also be made of traditional wires and rods without departing from the scope of the present invention. The basket (100) is supported on its rear side by a frame (200) which is also preferably made of molded plastic. Same size baskets (100) can be nested into one another so as to reduce the storing volume of a column of baskets (100) in a grocery store. For this reason, the basket (100) includes a front wall (120), two side walls (130), a bottom wall (140) and a rear wall which consists of a swinging rear wall (150) pivotable at an upper edge (158) thereof. A pivoting assembly (400) for a collapsible compartment which could be used as a support for children or as an extra compartment for groceries or the like, according to particular needs, is also provided. The pivoting assembly (400) may be fixed or removable from the cart (10).

As conventional shopping carts, the frame (200) comprises a base (250) mounted on wheels (300), two rear upright studs (210) as well as a handle (230) that forms a relatively rigid frame at the back of the basket (100). The frame (200) can be dismantled in order to enable the replacement of eventually defective or broken parts. The cart (100) could advantageously be assembled by using different component sizes following different applications or different basket sizes. Thus, the length studs can solely be used with a narrower or longer base in order to accommodate different basket volumes or even two small baskets at the same time for particular applications.

The base (250) is provided with pivoting casters (304) at the front and fixed casters (306) at the back in order to facilitate the orientation and the displacements of the basket (100). It incorporates a horizontal lower support (260) for placing the more voluminous objects as well as a smaller basket (254), molded integrally to the base (250) which is accessible from the back and which acts as a structural element between the two studs (210).

The great versatility of the system enables also the frame (200) to be used without its basket (100) in order to create different types of carts for different applications such as the transportation of baggage in airports or by incorporating a pivoting shelf to transport cases in the warehouse stores.

Different handle widths can be provided for each base width. The handle (230) is preferably of ergonomic form and comprises a flat surface which could advantageously be used as a publicity support. This surface may or may not be covered with a transparent plastic component in order to protect the advertising zone. The latter also enables the insertion of a printed sheet, a sticker or the direct printing on the plastic of an advertising message, logos, a warning sign or any other message. The handle (230) can be equipped with a support for a shopping list, a calculator or a glass. This support can either be integrally molded to the handle or it can be mechanically attached thereto as an optional part.

Although not illustrated, existing baskets can optionally be provided with a latch system which links the baskets in the parks in order to prevent theft. There exist, for the basket, two possibilities of integration of a latch system. One is the installation of an existing system attached mechanically to the flat surface of the handle. A second is the integration of such system inside one of the two studs of a system. In the latter case, the casing of the latch system needs to be replaced by an external cover when the system is not in place.

All the components of the shopping cart (10) are preferably made by a process of injection of thermoplastic resins such as polyethylene, polypropylene, polyamide or any other appropriate resin.

Description of the Basket (100)

The basket size is preferably achieved with a single part by a process of injection of thermoplastic resin. Still referring to FIGS. 1 and 2, the basket (100) is provided with a swinging rear wall (150) at the rear, making the nesting of the baskets (100) possible. The basket (100) is made of side walls (130) slightly bent and perforated according to an outline similar to the other component of the product. These openings contribute to make the basket (100) more transparent and reduce the quantity of raw material and consequently its weight. Preferably, round and longitudinal lumps ensure the protection of the surface against scratching. The upper part of the basket (100) is preferably surrounded with a reinforcement band (102), ribbed on the outer side and which enables, by hot printing process or by screen process printing, to affix the signature (logo) of eventual clients. A vertical rib (104) runs along each rear side of the basket (100). These ribs (104) lie on the front of the studs (210) in order to provide to the whole structure an adequate transfer and support zone of the load of the basket (100) towards the structure of the cart.

Figure 3:
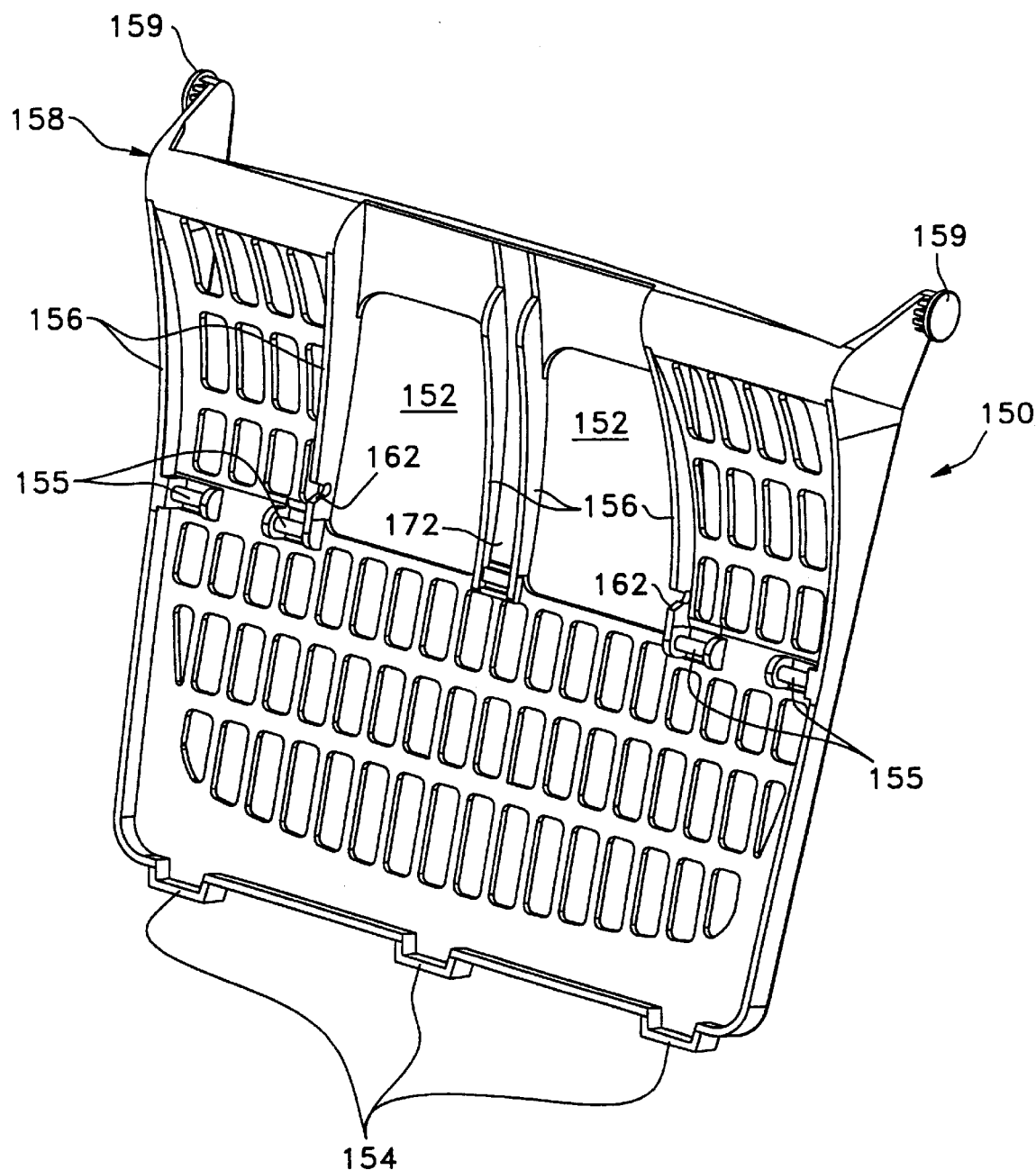
FIG. 3 is a perspective view of the swinging rear wall shown in FIG. 1 showing the inside face thereof visible from the inside of the basket.
Figure 4:
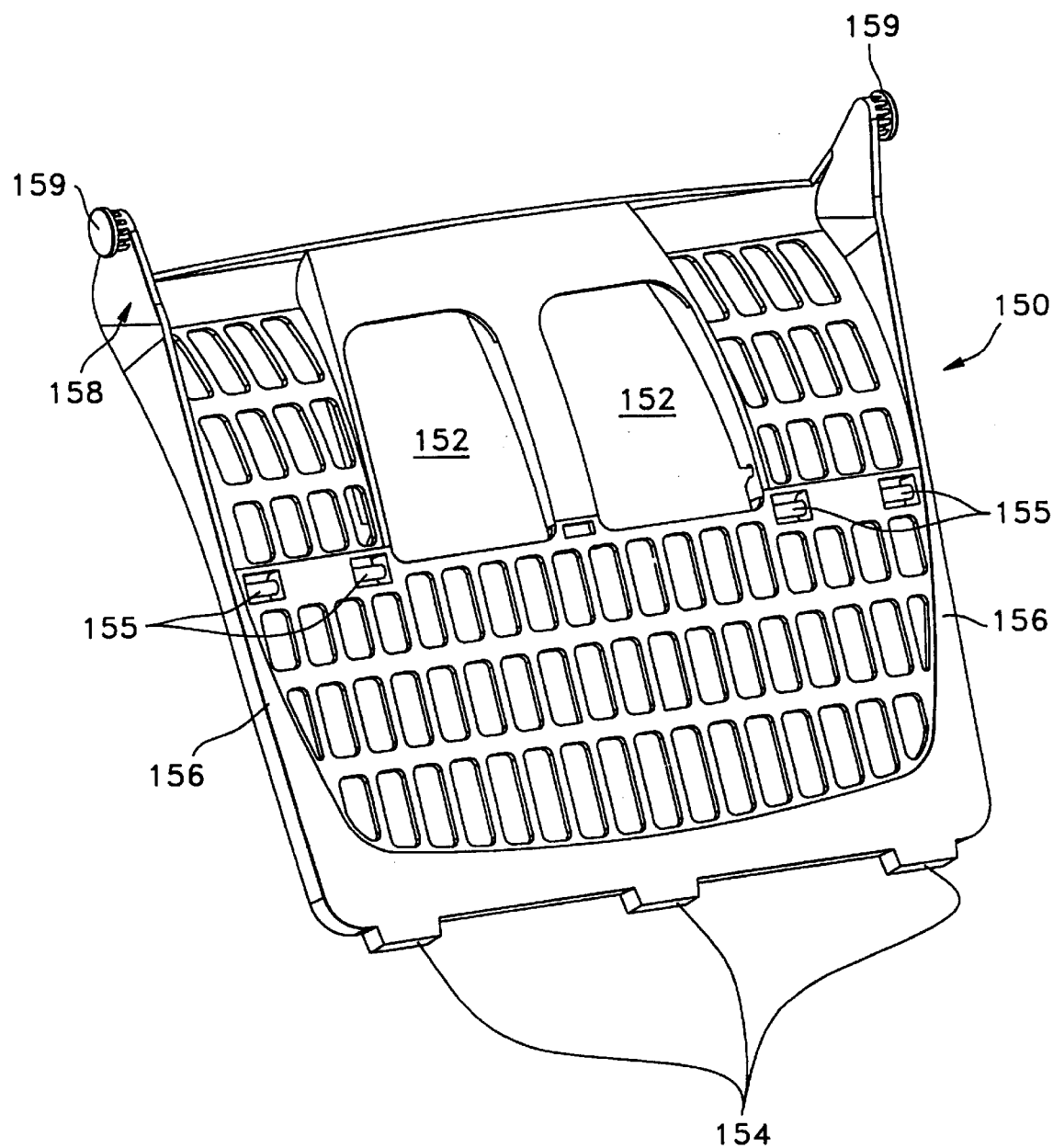
FIG. 4 is another perspective view of the swinging rear wall of FIG. 3 showing the outside face thereof visible from the outside of the basket.

The swinging rear wall (150) may be available in two version: with or without leg holes (152). Obviously, the one illustrated is the one with such leg holes (152). Referring now also to FIGS. 3 and 4, the preferred swinging rear wall (150) is relatively flat with a curved zone in its upper part in order to better promote the nesting of folded components. The bottom of the swinging rear wall (150) is preferably provided with restraint lumps (154) which are located at the base of the basket (100) during the use of the basket and enable to triangulate and rigidify the whole assembly. It is structured with a series of ribs and grooves (156) on its two main faces. As seen in FIG. 3 two of these ribs which extend on the inner side of the swinging rear wall (150) on both sides of the leg holes (152) are provided with a notch (162) which will serve for pivotally connecting the panel (470) as will be described below. Pivot shafts (155) are also provided on the inner side of the swinging rear wall (150) for pivotally connecting the base wall (410) of the collapsible compartment to the same. A vertical groove (172) extends in the middle of the inner side of the swinging rear wall (150) from the top edge (158) thereof to the base of the legs holes (152). As will be explained below, such groove (172) is used to install a spring blade (476).

The swinging rear wall (150) is perforated according to an outline comparable to the other components of the product in order to make it lighter and make the cart (10) as transparent as possible. The upper edge (158) of the swinging rear wall (150) is pivotally mountable between the studs (210). More specifically, each of the opposite side end of the upper edge (158) comprises a rotation axis (159) molded to the same swinging rear wall (150). As best shown in FIG. 2, these axes (159) are mounted in rotation in two semi-flexible grooves (212) at the upper end of the stud (210) which accepts deformations during collisions. These axes (159) could be reinforced if necessary, either by inserting therein a steel component by over-molding or by ratchet mechanism.

Pivoting Assembly of the Collapsible Compartment

Figure 5:
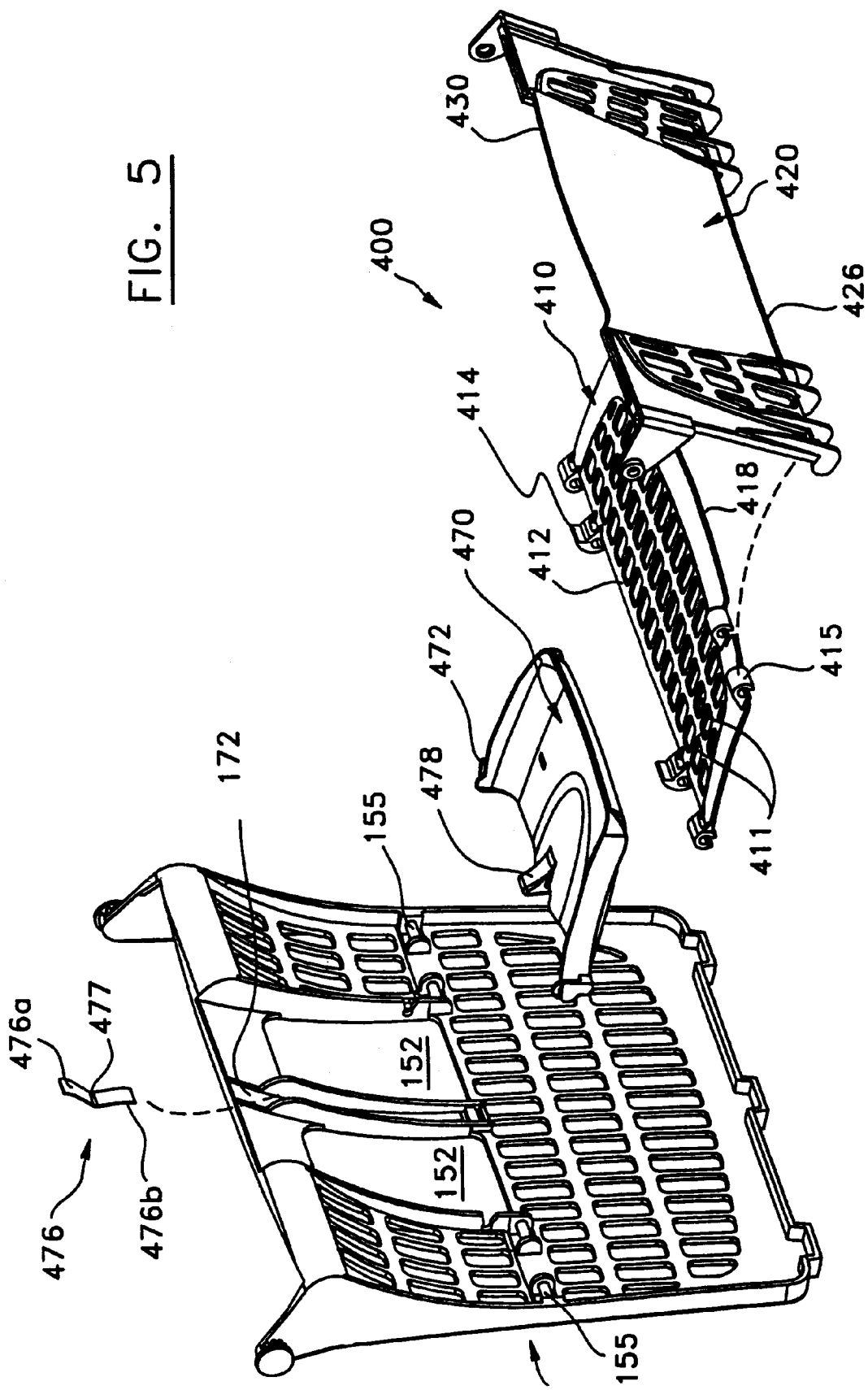
FIGS. 5 and 6 are both exploded perspective views of the pivoting assembly of the collapsible compartment illustrated in FIG. 1 showing the assembling thereof to the swinging rear wall.
Figure 6:
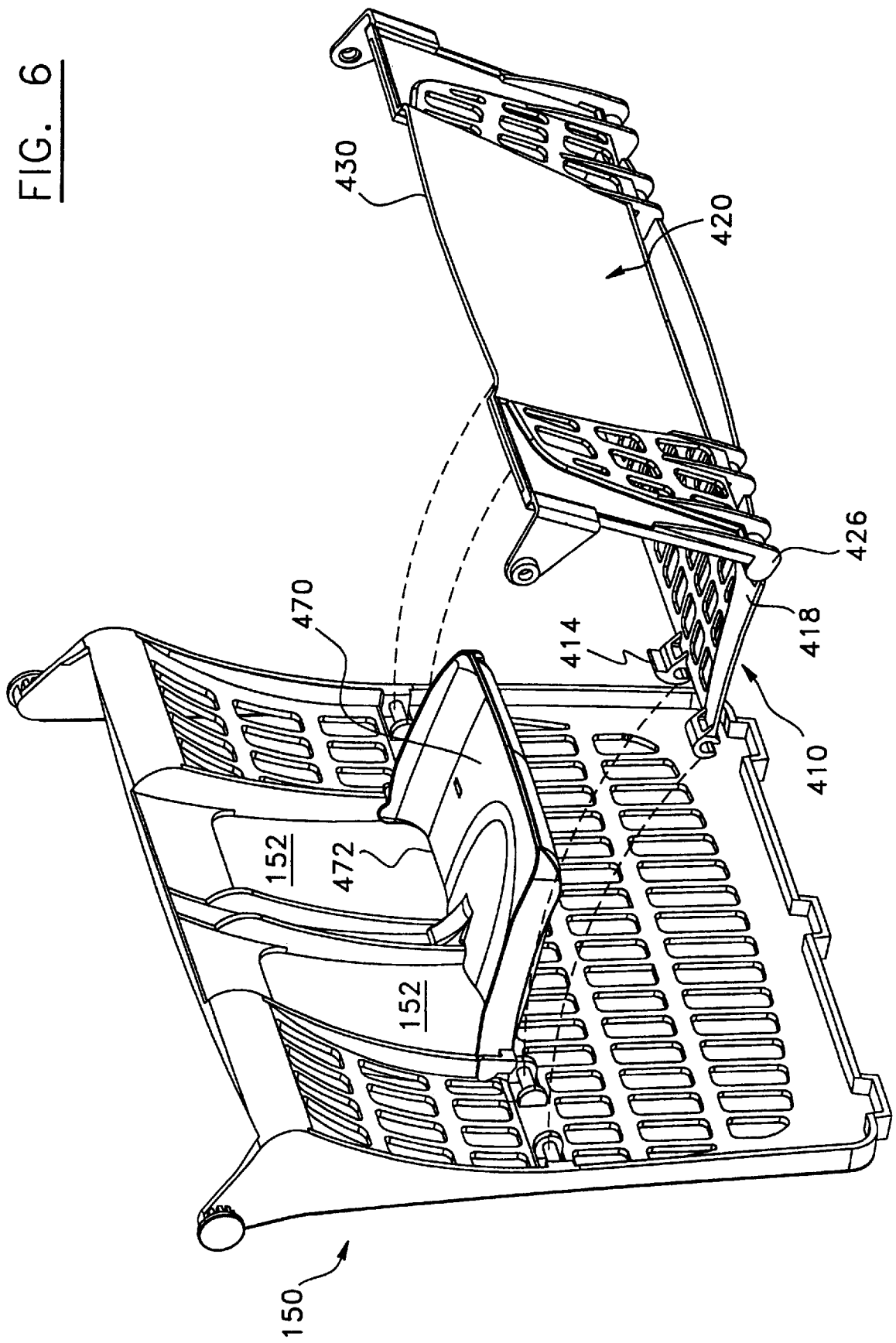

Referring now to FIGS. 5 and 6, the pivoting assembly (400) for the collapsible compartment, used often as a child support, can be either fixed to the cart or be removable therefrom. The compartment includes portions of the fixed side walls (130) and of the swinging rear wall (150) of the basket (100), as shown in FIG. 1, and the pivoting assembly (400). The pivoting assembly (400) comprises a base wall (410) having a first edge (412) for pivot connection to the swinging rear wall (150) and a second edge (418) opposite the first edge (412). The pivoting assembly (400) further comprises a front wall (420) that serves as a backrest if the compartment is used as a child support. The front wall (420) has an upper edge zone, represented in the embodiment illustrated by a first edge (430), pivotally securable between the side walls (130) of the basket (100) to prevent the front wall (420) from falling within the basket (100). The front wall (420) further has a second edge (426) hinged to the second edge (418) of the base wall (410) for allowing the base wall (410) to collapse on the front wall (420) upon nesting like shopping carts (10), as will be more fully explained hereinafter.

Figure 7:
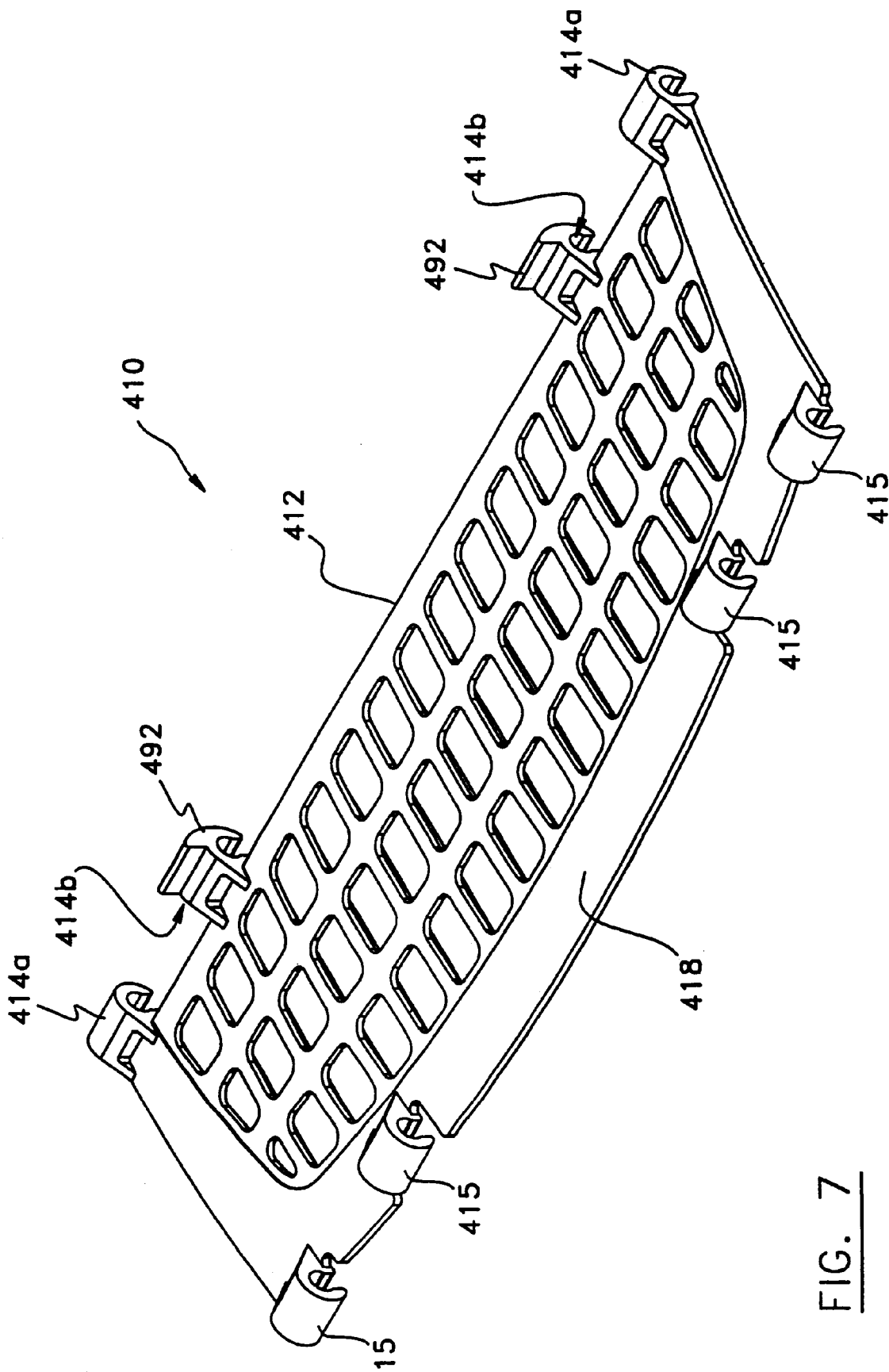
FIG. 7 is a perspective view of the base wall of the pivoting assembly of the shopping cart shown in FIG. 1.

Referring also to FIG. 7, the base wall (410) preferably consists of a relatively flat face perforated according to an outline comparable to those of the other components of the product. The perforations (also called openings (411)) of the base wall (410) contribute to make the piece more transparent and to reduce the quantity of raw material and consequently its weight. The base wall (410) comprises at least one hooking member (414) molded at the first edge (412) thereof for removable pivot attachment to the swinging rear wall (150). In the preferred embodiment illustrated, and as best seen in FIG. 7, two spaced hooks are molded on each opposite side of the first edge (412), an outer hook (414a) located at the end and an inner hook (414b) located inwardly with respect to the outer hook (414a). Each of these hooks (414) are pivotally mountable on pivot shafts (155) provided on both sides of the leg holes (152) of the swinging rear wall (150). These hooks (414) enable the rotation of the base wall (410) during the nesting of the baskets (100) by acting as a hinge. They are integrally molded to the part.

Very fine ribs are positioned between the openings under the part in order to increase its rigidity. The base wall (410) also comprises at least one hooking member (415), four in the illustrated embodiment, molded at the second edge (418) for pivot attachment to the second edge (426) of the front wall (420).

Figure 8:
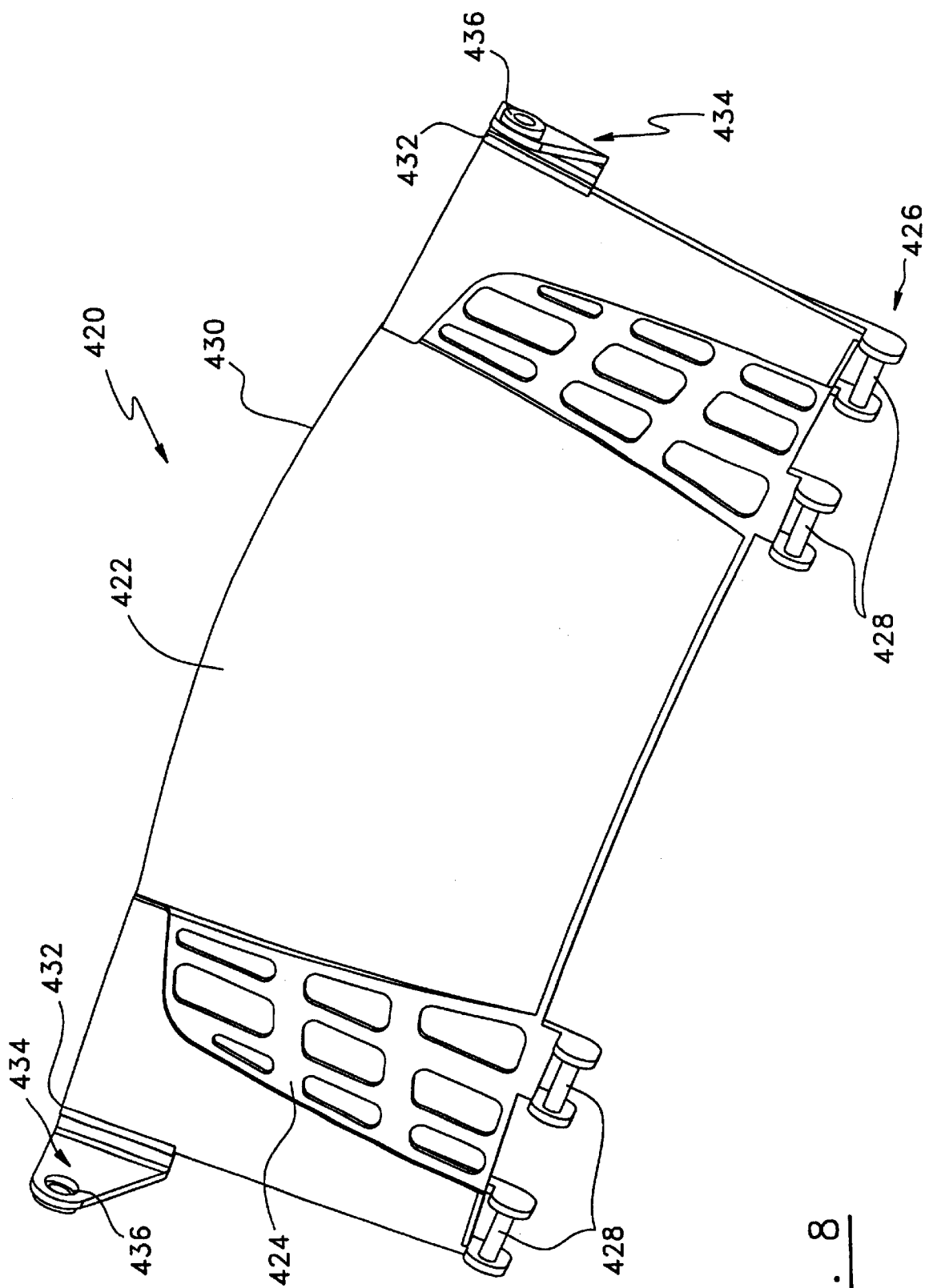
FIG. 8 is a perspective view of the front wall of the pivoting assembly of the shopping cart shown in FIG. 1.

Turning also to FIG. 8, the front wall (420) illustrated has the same type of construction as the base wall (410). It comprises a central zone (422) in the shape of a backrest and sides openwork (424) according to an outline similar to the other pieces in order to reduce its weight. The second edge (426) is hinged to the second edge (418) of the base wall (410). It integrates a pivot axis (428) molded integrally or in steel, installed mechanically, each of these pivot axes being adapted to pivotally receive thereon a corresponding hook (415) of the base wall (410).

As apparent to a person in the art, the pivot connection between the rear wall and the base wall or the base wall and the front wall could be obtained by any other hinge means without departing from the scope of the present invention. For example, any other hinge means provided with wire already disclosed in the prior art could be used.

The pivoting assembly (400) also comprises means for pivotally attaching the first edge (430) of the front wall (420) to the side walls (130) of the basket (10). Preferably, the first edge (430) of the front wall (420), in other words, the top edge thereof, is pivotally secured between the side walls (130) of the basket (100) by means of a pivot member (436) projecting sidewards from each of the opposite side ends (432) of the first edge (430). Each of these two pivot members (436) is insertable into a pivot housing (132) provided in a corresponding side wall (130) of the basket (100) proximate a top edge (134) thereof, as best seen in FIG. 2. These pivot members (436) are each sized to freely rotate in its corresponding pivot housing (132). A cap may be provided to cover the pivot housing (134).

Even more preferably, as illustrated, each of the side ends (432) consists of an extension member (434), in the shape of molded corners extending rearwardly towards the swinging rear wall (150) at substantially right angle with the front wall (420). The extension member (434) has an inner face facing inside the collapsible compartment (400) opposite an outer face, the pivot member (436) which is preferably disk-shaped being located on the outer face.

The portions of the side walls (130) of the basket (100) serving as side walls for the compartment are preferably smooth and solid without perforations to prevent a child sitting in the compartment from passing his or her fingers through the side walls as in conventional shopping carts, and thereby reducing the risk of injuries.

As can be appreciated, the pivoting assembly (400) illustrated is preferably made of plastic and is easily removable from the shopping cart and thus has the advantage of being very easily interchangeable with a like pivoting assembly when necessary. It is however understood that the invention is not limited to this particular construction. For example, a pivoting assembly according to the present invention may advantageously be made of traditional wires and rods, or it could also be permanently mounted to the cart without departing from the scope of the present invention.

Panel

Referring now to FIGS. 5, 6, 9 and 10, the panel (470) is mountable over the base wall (410) and has a first edge (472) for pivot attachment to the swinging rear wall (150). The panel (470) is movable between a first substantially horizontal position to be used as a seat, as in FIGS. 5 and 6, and a second substantially vertical position for covering the leg holes (152) in the swinging rear wall (150).

Figure 11:
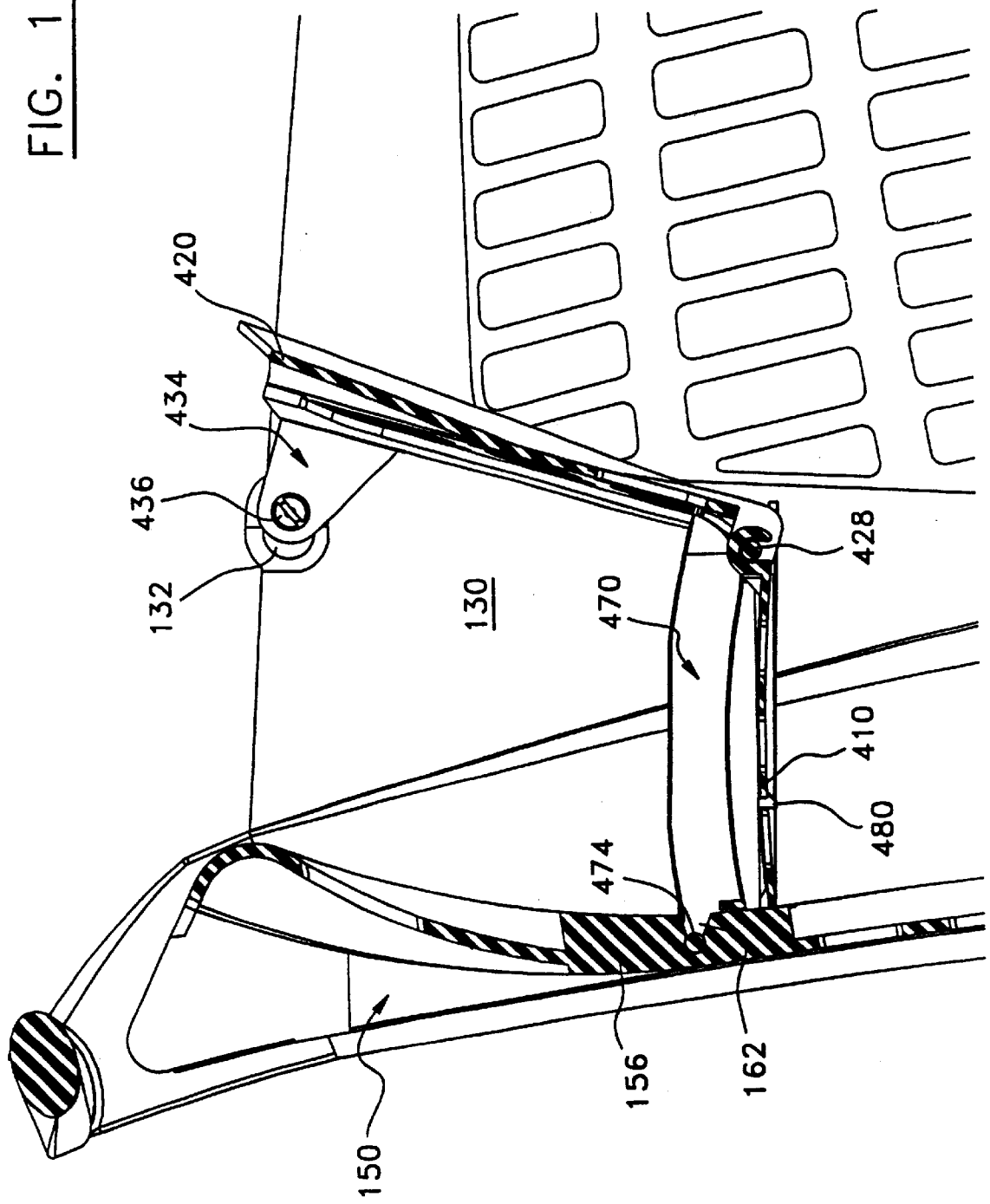
FIG. 11 is a cross-sectional side view, cut in the pivot of the panel, of the collapsible compartment of FIG. 1.

The panel (470) is preferably in the form of a seat rest with smooth and rounded panel molded by injection of thermoplastic resins. More preferably, it has a top side with a relief conforming substantially to the shape of a child buttocks. It is attached to the swinging rear wall (150) by means of pivot shafts (474) projecting sidewards from both opposite sides of the first edge (472) and adapted to be inserted in notches (162) provided in the rib (156) formed on each side of the leg hole (152), as shown in FIG. 11.

The pivoting assembly (400) further comprises actuating means for actuating a pivotal movement of the panel (470) towards the vertical position upon a forward displacement of the swinging rear wall (150) towards the front wall (120) of the basket (100).

Preferably, a double system is provided to actuate automatically the motion of the panel (470) towards the swinging rear wall (150) during the nesting of the baskets.

Figure 9:
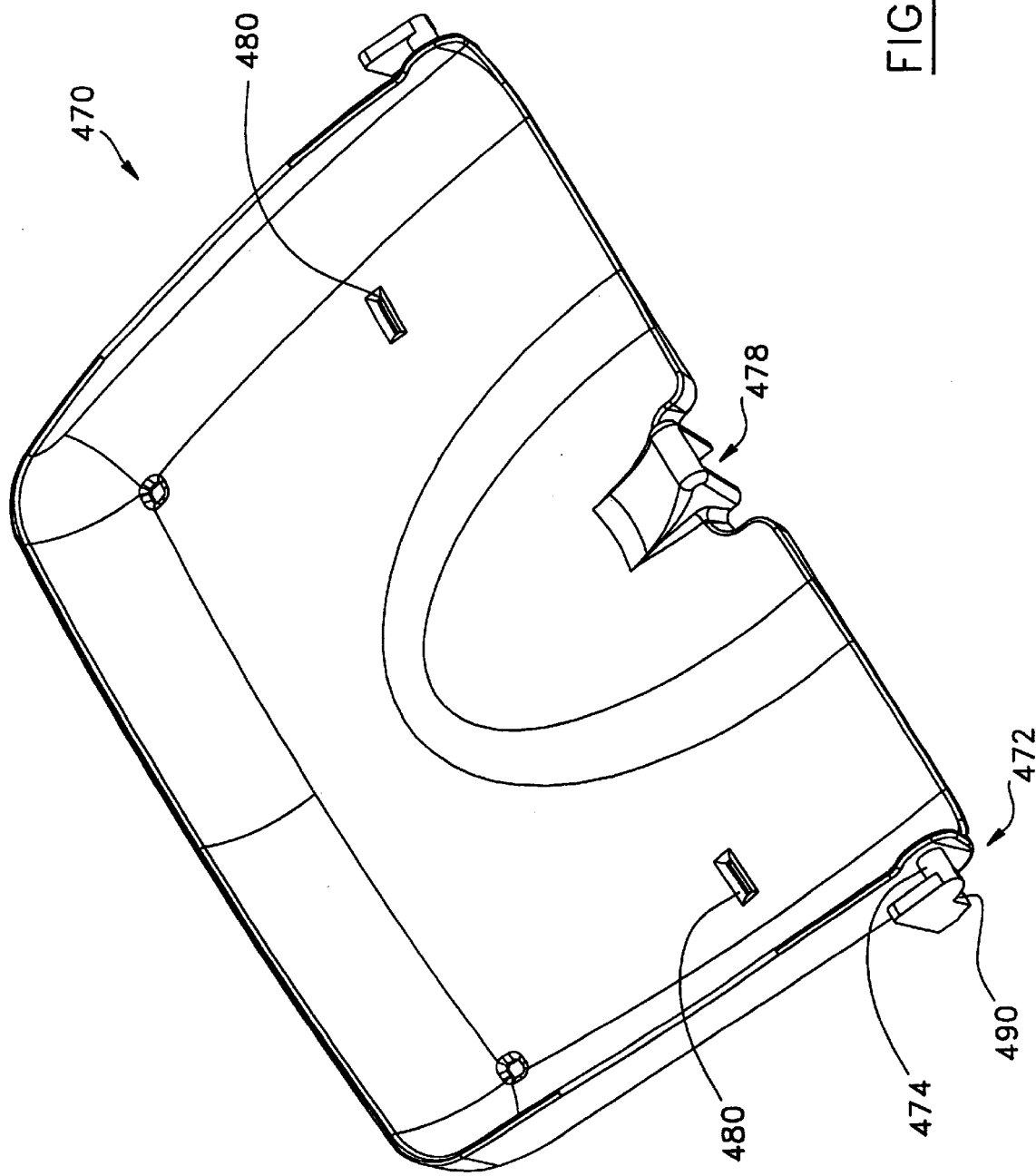
FIG. 9 is a perspective view of the panel of the pivoting assembly of the shopping cart shown in FIG. 1 seen from the top.
Figure 10:
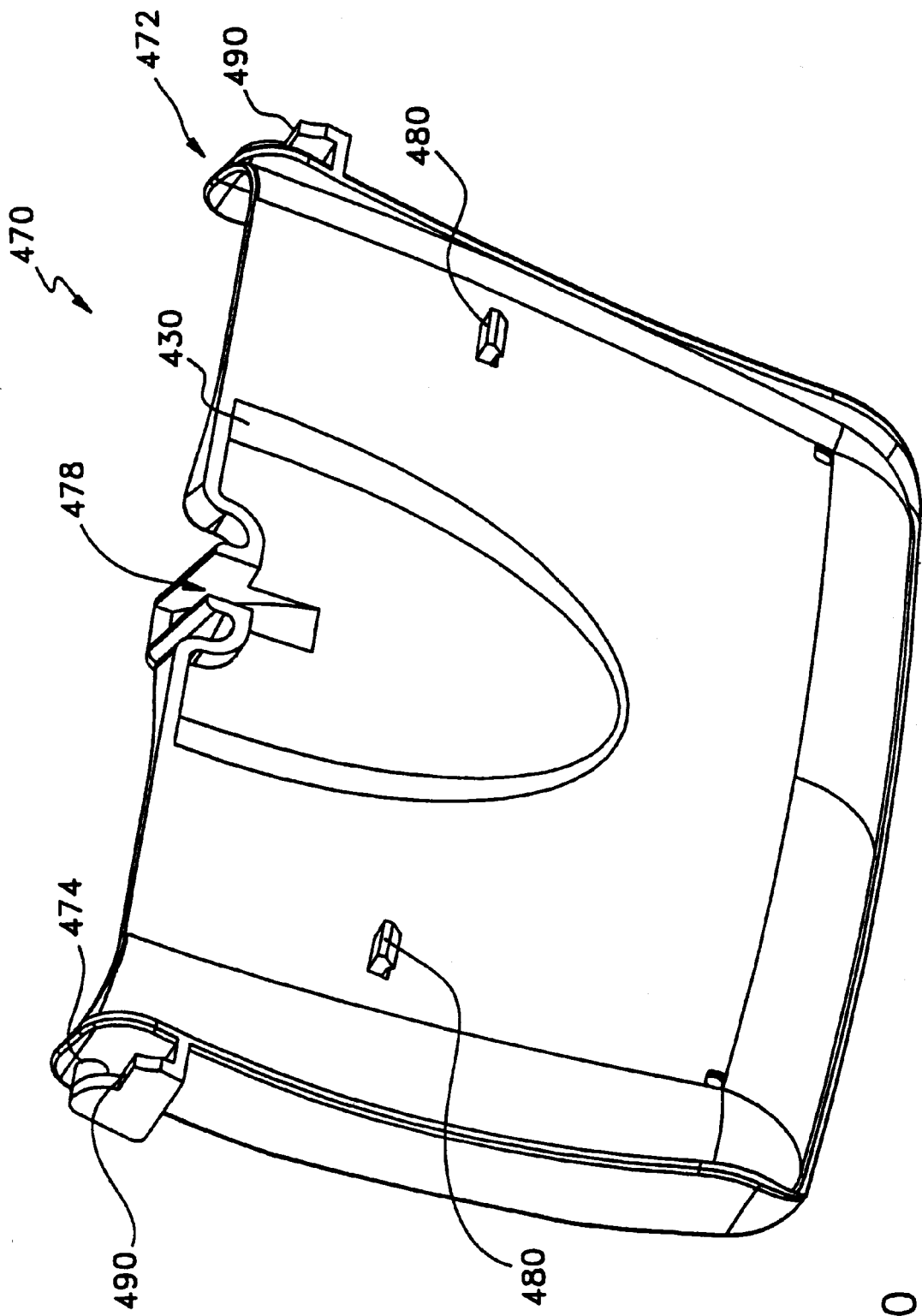
FIG. 10 is another perspective view of the panel of FIG. 9, seen from the bottom.
Figure 12:
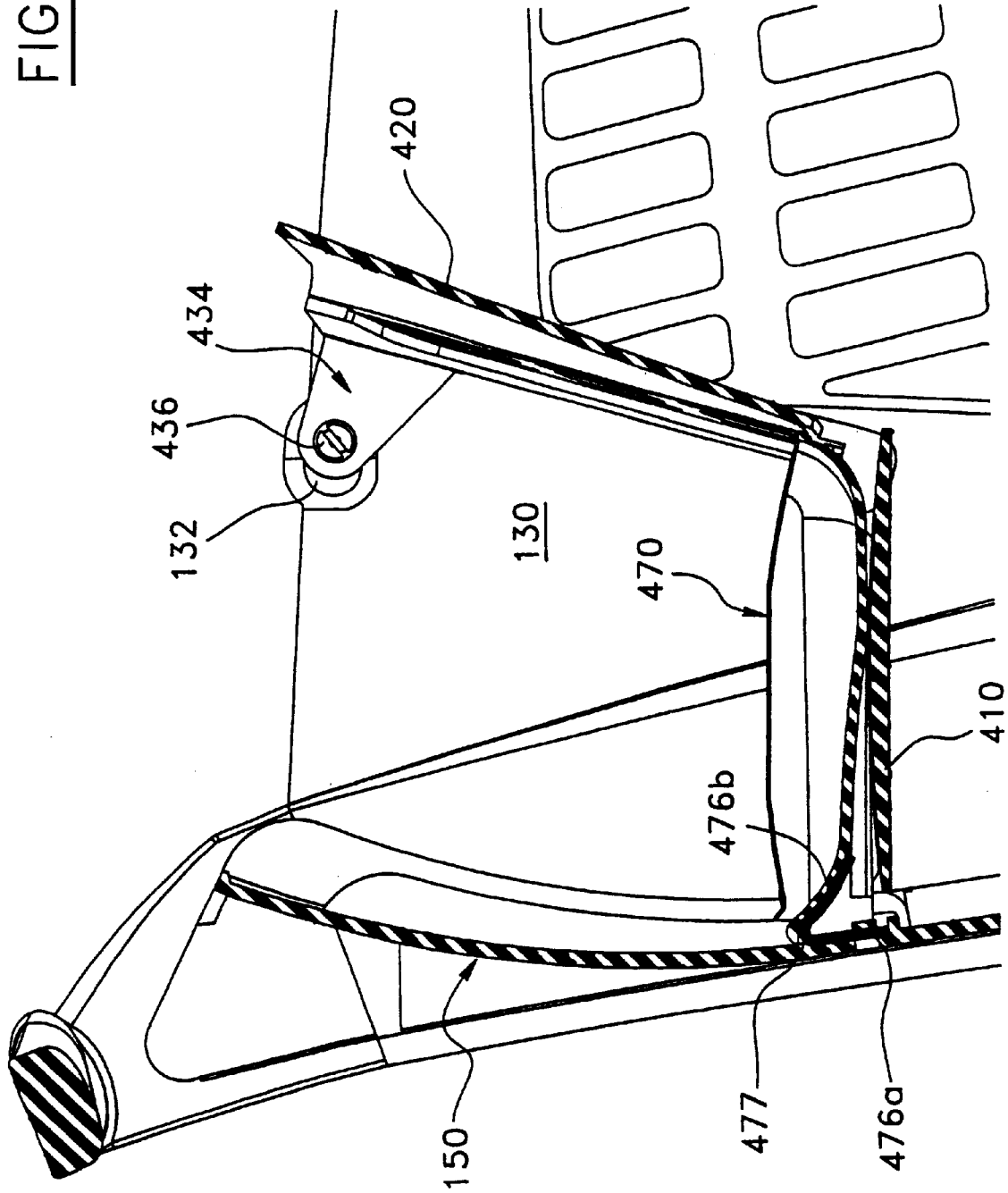
FIG. 12 is another cross-sectional side view, cut in the middle of the panel, of the collapsible compartment, and showing the housing underneath the panel for receiving the spring blade.
Figure 13:
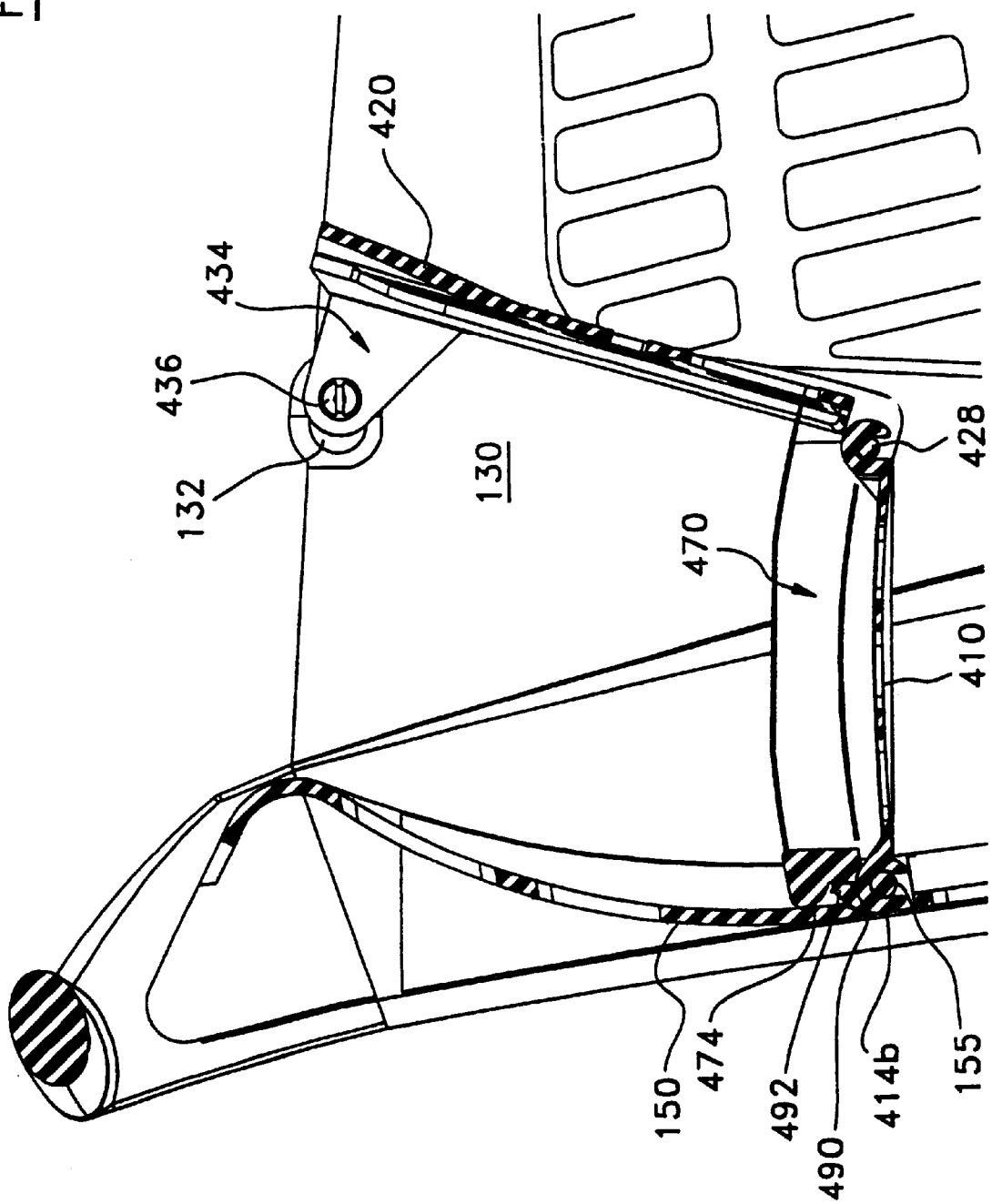
FIGS. 13 to 16 are all cross-sectional views in one pivot of the base wall showing a sequence of motions of the components of the collapsible compartment of the cart, shown in FIG. 1, upon nesting with a like cart.

Motion the panel (470) will now be described by referring also to FIGS. 12 to 16. The first system comprises a biasing means for urging the panel (470) in the vertical position and a retaining means for releasably retaining the panel (470) in the horizontal position. The biasing means preferably comprises a spring element (476) more preferably a spring blade, as best shown in FIGS. 5 and 12. However, a helical spring could also be an appropriate spring element to use. The spring element (476) has a first end portion (476*a*) for abutment against the swinging rear wall (150), as shown in FIG. 12, opposite a second end portion (476*b*). The first and second end portion (476*a,b*) are separated by a folding line (477) of the spring element (476). Turning also to FIGS. 9 and 10, a section, preferably a molded housing (478), is provided underneath the panel (470) for receiving the second end portion (476*b*) of the spring element (476) to urge the panel (470) in the vertical position, the housing (478) being so located that the folding line (477) of the spring element (476) is coaxial with the pivot axis of the panel (470).

The panel (470) which is preferably made of a one piece material comprises a top side, best shown in FIG. 9, and an underside, best shown in FIG. 10. The housing is preferably molded centrally at the first edge of the panel (472) and it includes a slanted top wall sloping upwardly from the top side of the panel towards the first edge (472) thereof, as shown in FIGS. 5 and 12.

Also preferably, a vertically extending groove (172) is centrally positioned in the swinging rear wall (150) for receiving the first end portion (476*a*) of the spring element (476).

As best seen in FIG. 12, the spring element (476) is out of reach of a child sitting in the compartment and thus reduces the risk of injuries.

The retaining means for releasably retaining the panel (470) in the horizontal position preferably comprises a hooking member (480) projecting from the underside of the panel (470), the hooking member (480) being removably engageable to a hook anchoring member consisting of an opening (411) provided in the base wall (410).

Thus, a spring blade (476), integrally molded or set mechanically in the part, urges the panel (470) vertically when the user takes a basket (100). This enables him to use the compartment (400) as a secondary basket. To place a child on his or her seat, the user must push the panel (470) against the base wall (410) in order to trigger its hooks (480) in the openings (411) of the base wall (410). As soon as one moves the swinging rear wall (150) during a nesting, the hook (480) located underneath the panel (470) comes out of its hook anchoring member and gets up by itself.

The second mechanism to actuate the motion of the panel (470) towards the swinging rear wall (150) may be used by itself or it could serve as an assistance to the first one in the case of a failure of the spring system.

It comprises an abutment rib (490) at the first edge (472) of the panel (470) and extending below the pivot (474) thereof and a cam like member (492) projecting upwardly from the first edge (412) of the base wall (470) for engaging the abutment member (490) of the panel (470) upon forward displacement of the swinging rear wall (150) and thereby producing motion of the panel (470) towards the vertical position.

Figure 14:
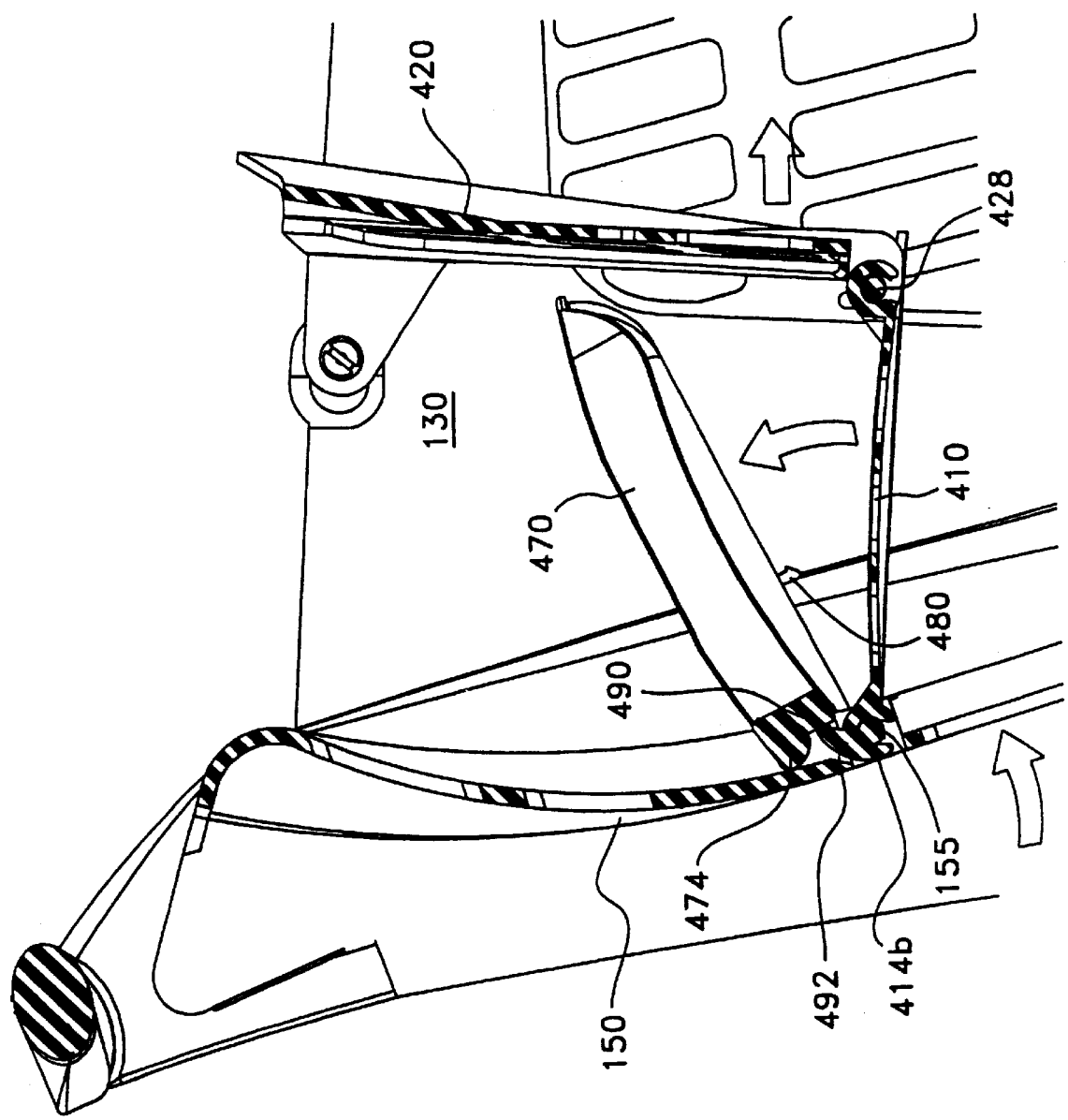
Figure 15:
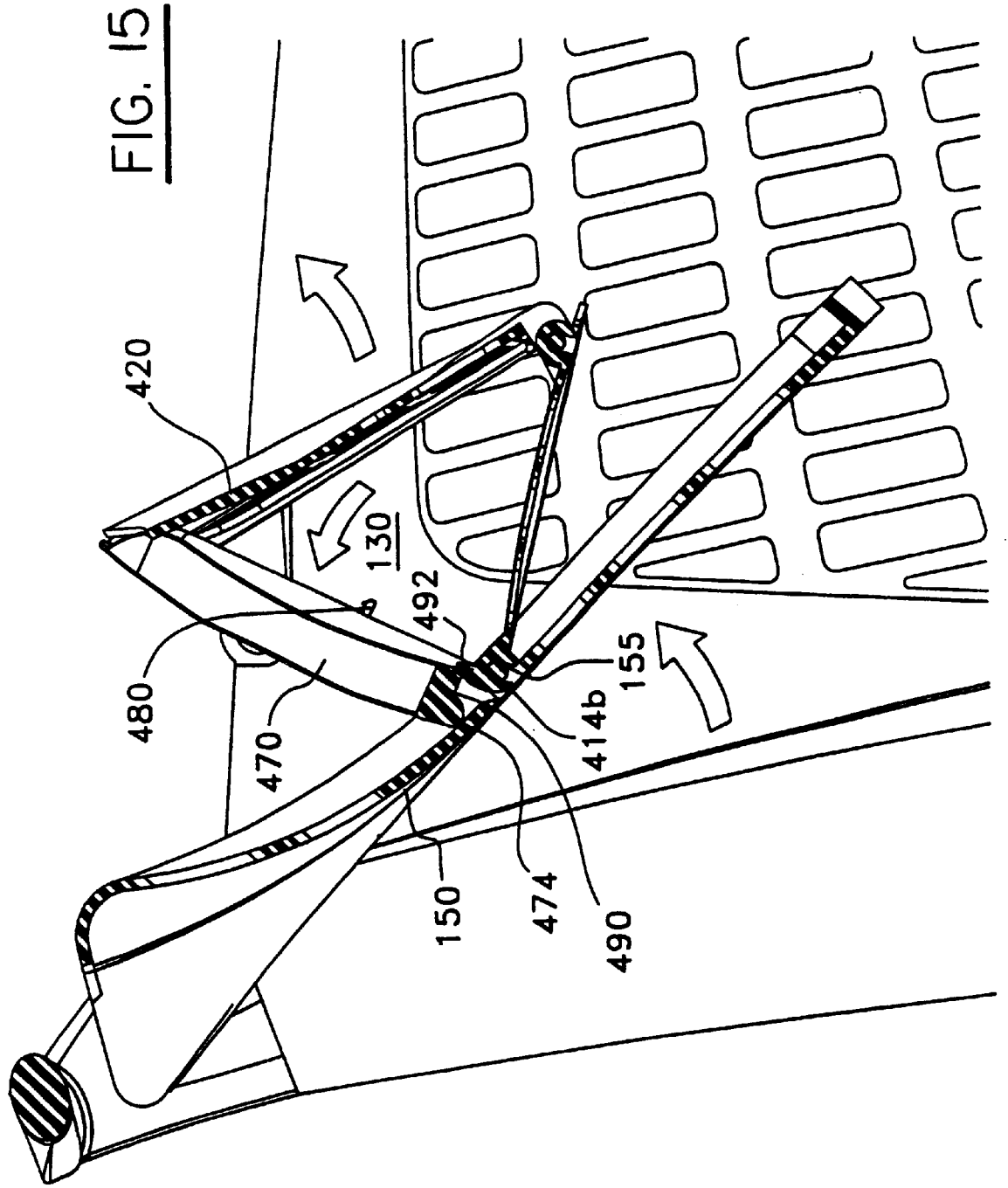
Figure 16:
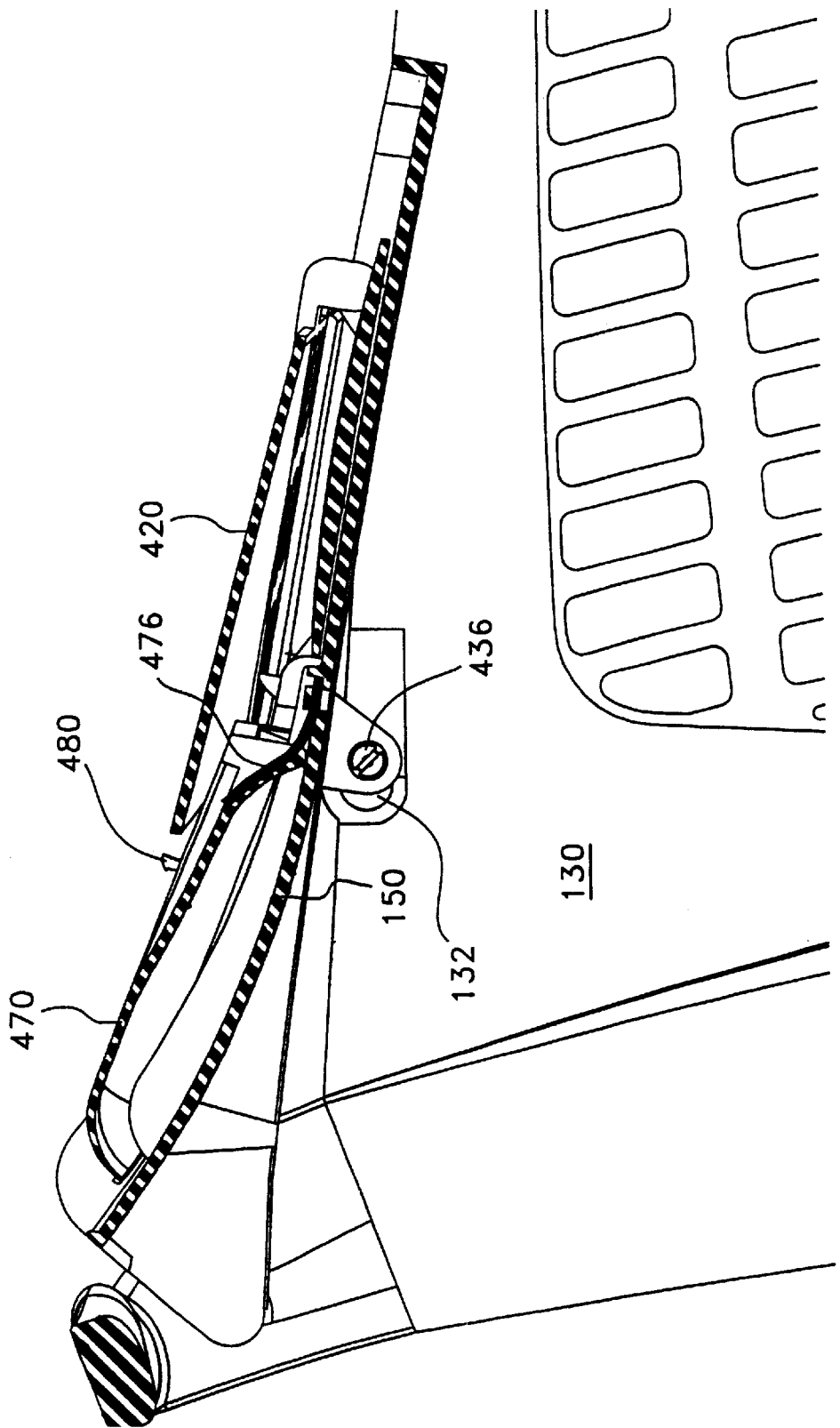

Preferably, such an abutment rib (490) is provided on each of the pivot shafts (474) of the panel (470) and a cam like member (492) is provided on each inner hook (414*b*) of the base wall (410). As can be appreciated from FIGS. 13 to 16, upon forward displacement of the swinging rear wall (150), the cam like members (492) of the base wall (410) engage the abutment ribs (490) of the panel (470), as best shown in FIG. 14, thereby initiating or actuating the rotation of the two pieces. The continuation of the movement is natural when the front wall (420) comes into contact with the panel (470). The latter, which preferably has rounded geometry, slides against the front wall (420), and automatically takes its place between the components.

Steps to Assemble the Pivoting Assembly to the Cart

In order to assemble the pivoting assembly (400) to the cart (10), the spring blade (476) is first slid into the centrally and vertically extending groove (172) of the swinging rear wall (150), as shown in FIG. 5. Then, the panel (470) is assembled to the swinging rear wall (150) by inserting the two pivots (474) in their respective notch (162) provided on each rib (156) of the swinging rear wall (150). The pivots (474) are held in place by plastic deformation.

The front wall (420) is then assembled to the base wall (410) by inserting its lower pivots (428) in the hooking member (415) of the base wall (410), as shown in FIG. 5. The previously assembled front wall (420) and base wall (410) are set to the swinging rear wall (150) by attaching the front hooks (414) of the base wall (410) on the integrated pivots (155) of the swinging rear wall (150), as shown in FIG. 6.

Although a preferred embodiment of the present invention has been described in detail herein and illustrated in the accompanying drawings, it is to be understood that the invention is not limited to this precise embodiment and that various changes and modifications may be effected therein without departing from the scope or spirit of the present invention.

What is claimed is:

1. A pivoting assembly for a collapsible compartment of a shopping cart, the collapsible compartment including a swinging rear wall and fixed side walls of the shopping cart, the pivoting assembly comprising:
   a pivoting base wall having a first edge for pivotal connection to the swinging rear wall and a second edge opposite the first edge;
   a pivoting front wall having a first edge for pivotal attachment between the side walls of the shopping cart, and a second edge, opposite the first edge thereof, pivotally connected to the second edge of the pivoting base wall.

2. A pivoting assembly as claimed in claim 1, wherein the first edge of the pivoting front wall has two opposite side ends and the pivoting assembly comprises:
   a pivot member projecting sidewards from each of said opposite side ends for insertion into a pivot housing provided in a corresponding side wall of the basket proximate a top edge thereof, the pivot member being sized to freely rotate in the pivot housing.

3. A pivoting assembly as claimed in claim 2, wherein each of said side ends consists of an extension member extending at substantially right angle with the front wall, said pivot member being located on the extension.

4. A pivoting assembly as claimed in claim 3, wherein said pivot member is disk-shaped.

5. A pivoting assembly as claimed in claim 1, further comprising a panel having a first edge for pivot connection to the swinging rear wall, the panel being pivotable on a pivot axis between a first position where the panel rests over the base wall and a second position where the panel is covering leg holes in the swinging rear wall.

6. A pivoting assembly as claimed in claim 5, further comprising actuating means for actuating a pivotal movement of the panel towards the second position upon a forward displacement of the swinging rear wall.

7. A pivoting assembly as claimed in claim 6, wherein the actuating means comprises:
   an abutment member at the first edge of the panel below the pivot axis thereof; and
   a cam like member projecting upwardly from the first edge of the base wall for engaging the abutment member of the panel upon forward displacement of the swinging rear wall and thereby producing motion of the panel towards the second position.

8. A pivoting assembly as claimed in claim 7, wherein the first edge of the panel comprises two opposite side ends and the panel comprises a pivot shaft projecting sidewards from each side end of the panel for insertion into a notch provided in the swinging rear wall.

9. A pivoting assembly as claimed in claim 8, wherein said abutment member comprises an abutment rib molded on each pivot shaft of the panel.

10. A pivoting assembly as claimed in claim 9, comprising at least two hooking members molded at the first edge of the base wall for removable pivot connection of the first edge to a pivot axis in the swinging rear wall.

11. A pivoting assembly as claimed in claim 10, wherein the cam like member comprises a cam like projection molded on two of said at least two hooking members.

12. A pivoting assembly as claimed in claim 7, wherein the actuating means further comprises a biasing means for urging the panel in the second position and a retaining means for releasably retaining the panel in the first position.

13. A pivoting assembly as claimed in claim 12, wherein the biasing means comprises:
   a spring element having a first end portion for abutment against the swinging rear wall, and a second end portion opposite the first end portion, the first and second end portion being separated by a folding line of the spring element; and
   the first edge of the panel having a section underneath the panel for receiving the second end portion of the spring element to urge the panel in the second position, the section being so located that the folding line of the spring element is coaxial with the pivot axis of the panel.

14. A pivoting assembly as claimed in claim 13, wherein the panel is made of a one piece material and comprises a top side and an underside, and the section underneath the panel for receiving the second end portion of the spring element is a housing molded centrally at the first edge of the panel, the housing including a slanted top wall sloping upwardly from the top side of the panel towards the first edge of the panel.

15. A pivoting assembly as claimed in claim 14, wherein the biasing means further comprises a vertically extending groove centrally positioned in the swinging rear wall for receiving the first end portion of the spring element.

16. A pivoting assembly as claimed in claim 15, wherein the spring element is a spring blade.

17. A pivoting assembly as claimed in claim 12, wherein the retaining means comprises a hooking member projecting from the underside of the panel, the hooking member being removably engageable to a hook anchoring member provided in the base wall.

18. A pivoting assembly as claimed. in claim 5, wherein the panel has a top side having a relief conforming substantially to the shape of a child buttocks.

19. A pivoting panel assembly for a collapsible compartment of a shopping cart, the collapsible compartment including a swinging rear wall of the shopping cart, and a base wall having a first edge connected to the swinging rear wall, the pivoting panel assembly comprising:
   a spring element having a first end portion for abutment against the swinging rear wall, opposite a second end portion;
   a panel having a first edge for pivot connection to the swinging rear wall on a pivot axis coaxial with a folding line of the spring element separating the first and second end portion thereof, the panel being pivotable between a first position where the panel rests over the base wall and a second position where the panel is covering leg holes in the swinging rear wall, and the first edge of the panel having a section underneath the panel for receiving the second end portion of the spring element to urge the panel in the second position; and
   retaining means for releasably retaining the panel in the first position;
      wherein the panel is made of a one piece material and comprises a top side and an underside, and the section underneath the panel for receiving the second end portion of the spring element is a housing molded at the first edge of the panel, the housing including a slanted top wall sloping upwardly from the top side of the panel towards the first edge of the panel.

20. A pivoting panel assembly as claimed in claim 19, wherein the housing is molded centrally at the first edge of the panel.

21. A pivoting panel assembly as claimed in claim 20, wherein the biasing means further comprises a vertically extending groove centrally positioned in the swinging rear wall for receiving the first end portion of the spring element.

22. A pivoting assembly as claimed in claim 19, wherein the spring element is a spring blade.

23. A pivoting assembly as claimed in claim 19, wherein the retaining means comprises a hooking member projecting from the underside of the panel, the hooking member being removably engageable to a hook anchoring member provided in the base wall.

24. A plastic shopping cart comprising:

a wheeled frame;

a basket mounted elevated on the frame and including a bottom wall, two side walls, a front wall and a swinging rear wall to permit nesting of the cart with like shopping carts, the swinging rear wall having an inside face facing towards the front wall of the basket and a spring receiving groove in the inside face thereof, said spring receiving groove being vertically and centrally positioned in the swinging rear wall;

a collapsible compartment inside the basket including the side walls and the swinging rear wall of the basket, and a pivoting assembly comprising:

a pivoting base wall having a first edge with at least two molded hooking members each for removable pivotal connection of the first edge to a pivot axis in the swinging rear wall, and a second edge opposite the first edge;

a pivoting front wall having a first edge for pivotal connection between the side walls of the shopping cart, and a second edge, opposite the first edge thereof, pivotally connected to the second edge of the pivoting base wall, said first edge of the front wall having two opposite side ends each consisting in an extension member extending at substantially right angle with the front wall, and the front wall having a pivot member projecting sidewards from each of said extension members for insertion into a pivot housing provided in a corresponding side wall of the basket proximate a top edge thereof, the pivot member being sized to freely rotate in the pivot housing;

a panel having a first edge with two opposite side ends and a pivot shaft projecting sidewards from each said side end of the panel for insertion into a notch provided on the inner face of the swinging rear wall, the panel being pivotable on a pivot axis between a first position where the panel rests over the base wall and a second position where the panel is covering leg holes in the swinging rear wall, the panel being made of a one piece material and comprising a top side, an underside and a spring receiving housing molded centrally at the first edge thereof underneath the panel, the housing including a slanted top wall sloping upwardly from the top side of the panel towards the first edge thereof;

actuating means for actuating a pivotal movement of the panel towards the second position upon a forward displacement of the swinging rear wall, the actuating means comprising:

an abutment rib molded on each pivot shaft of the panel below the pivot axis thereof;

a cam like projection molded on two of said at least two hooking members of the base wall and projecting upwardly from the first edge of the base wall for engaging a corresponding one of said abutment ribs of the panel upon forward displacement of the swinging rear wall and thereby producing motion of the panel towards the second position;

a spring blade to urge the panel in the second position, the spring blade having:

a first end portion for insertion in the spring receiving groove and for abutment against the swinging rear wall, and a second end portion opposite the first end portion, for abutment against the top wall of the spring receiving housing to urge the panel in the second position, the first and second end portion being separated by a folding line of the spring element coaxial with the pivot axis of the panel; and a retaining means for releasably retaining the panel in the first position, the retaining means comprising a hooking member projecting from the underside of the panel, the hooking member being removably engageable to a hook anchoring member provided in the base wall.

* * * * *